March 5, 1929.  W. C. STARKEY  1,704,062
SCREW DRIVER
Filed Aug. 16, 1926
Fig. 1.
Fig. 2.
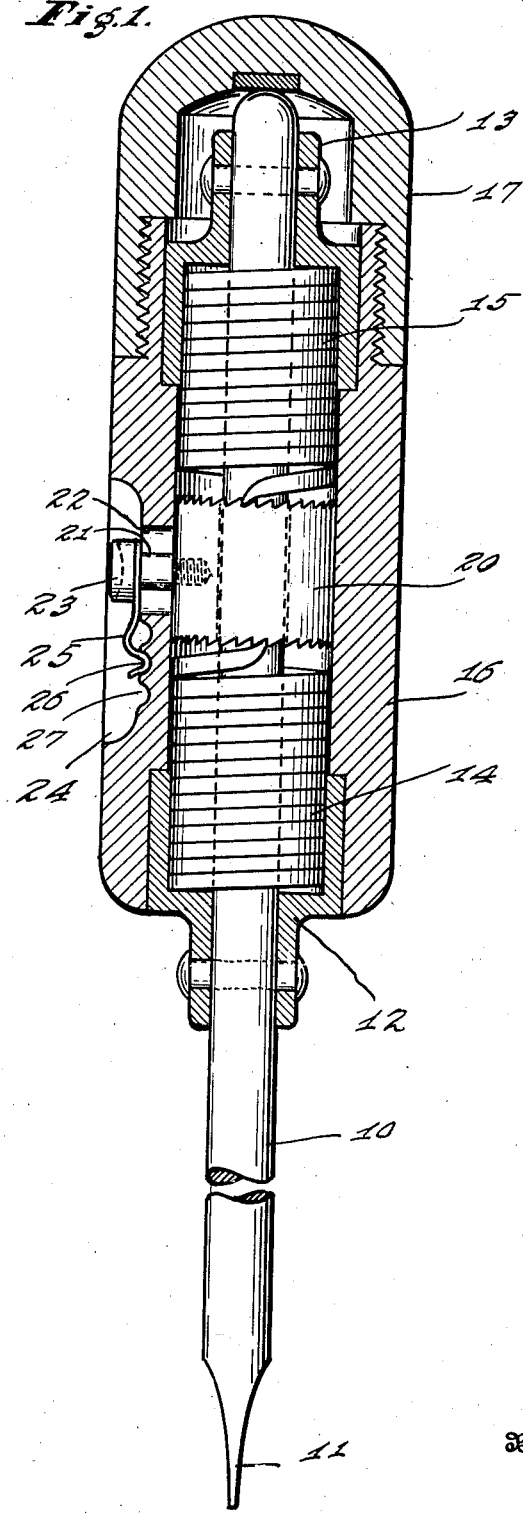
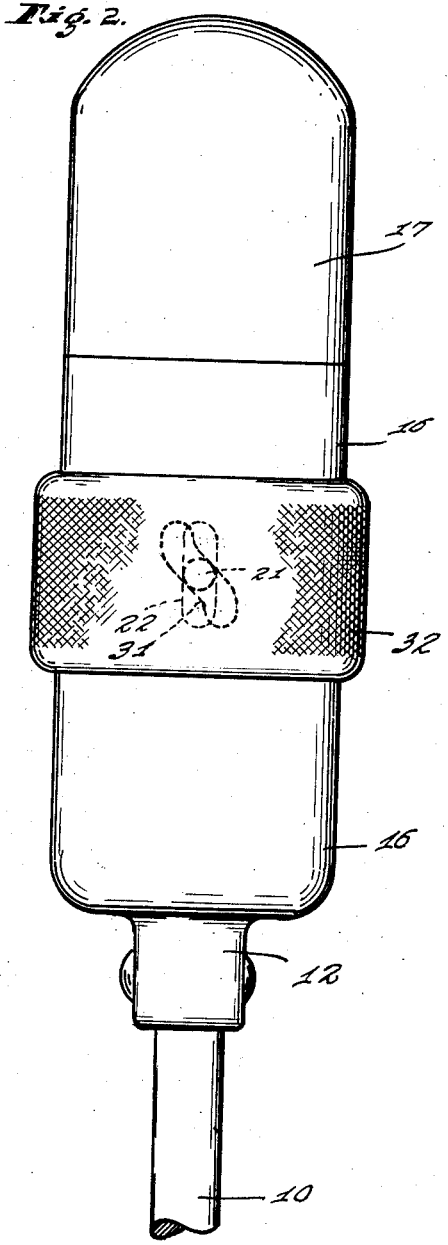
Inventor
WILLIAM CARLETON STARKEY,
By G. B. Schley.
Attorney Patented Mar. 5, 1929.

1,704,062

UNITED STATES PATENT OFFICE.

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA.

SCREW DRIVER.

Application filed August 16, 1926. Serial No. 129,320.

It is the object of my invention to produce a ratchet device particularly adaptable to screw drivers or similar tools. More specifically, it is my object to produce a ratchet device which may be employed in interconnecting the tool and its operating member in such a manner that oscillation of the operating member will produce rotation of the tool in either direction or in such a manner that the operating member and tool may be rigidly interconnected.

I accomplish the above object by interconnecting the tool and operating member with a pair of coil springs, each of which is operatively connected to one of such parts and extends into a recess in the other of such parts, each spring having an external diameter less than the diameter of its associated recess, and I provide means by which the recessed member may be connected to either or both of such springs.

The accompanying drawing illustrates my invention: Fig. 1 is a longitudinal central section of my device applied to a screw driver, and Fig. 2 is a side elevation of a slightly modified form of screw driver.

The screw driver to which my invention is shown as applied embodies the usual shank 10 and point 11. Fixed to the shank 10 in spaced relation are two members 12 and 13 to which are respectively connected two coil springs 14 and 15. Conveniently, the adjacent axial faces of the two members 12 and 13 are recessed for the reception of such coil springs. The two members 12 and 13 extend into opposite ends of the axial bore of a handle 16, such handle being counterbored for this purpose. Desirably, the handle 16 is provided with a cap 17 which may be screw-threadedly mounted on the handle.

The internal diameter of the cups 12 and 13 is slightly smaller than the normal external diameter of the springs 14 and 15 in order operatively to connect such springs with the shank 10 of the screw driver. This method of interconnecting the springs and the screw driver shank is desirable, but is not necessary to my invention, as any means may be employed which will cause or which will tend to cause the springs to rotate with the shank 10.

These portions of the bore of the handle 16 receiving the springs 14 and 15 have a diameter slightly larger than the normal external diameter of the springs in order that there will be no friction between the springs and the inner surface of the handle 16 when the springs are unstressed.

The adjacent ends of the springs 14 and 15 are bent toward each other and engage opposite axial faces of an actuating member 20 which is slidable within the handle 16. Preferably, the spring ends are pointed somewhat and the axial faces of the actuating member 20 provided with a peripheral series of radial grooves which may engage the spring ends.

The actuating member 20 is provided with a shifting member 21 which extends through an axial slot 22 in the wall of the handle 16 for use in shifting the actuating member 20. The pin 21 is preferably provided with a head 23, such head being located in a recess 24 in the outer surface of the handle 16 in order that it may not interfere with the operation of the screw driver. To hold the actuating member 20 in any of its positions of adjustment, a spring 25 is connected to the pin 21 and is provided with a lip 26 adapted to engage any one of three notches 27 in the handle 16 of the screw driver.

The actuating member 20 is shown in the drawings as being in its middle position in which it engages the inner ends of both of the springs 14 and 15. The springs 14 and 15 are both wound in the same direction. The springs are shown as being right-hand wound, but they might be left-hand wound springs without affecting the operation of the device. When the handle 16 is rotated, such rotation will cause one or the other of the springs 14 and 15 to unwind partially and to expand into firm frictional engagement with the inner surface of the handle 16, and this frictional engagement will serve to clutch the handle 16 firmly to the shaft 10, so that the screw driver will operate as if the handle 16 and shank 10 are integral.

To use the screw driver as a ratchet screw driver, the actuating member 20 is moved from its middle position to one of its end positions depending upon the direction in which it is desired to rotate the screw which is engaged by the point 11. If it is desired to rotate the screw in a clockwise direction, the actuating member 20 is moved toward the screw driver point 11 until the lip 26 of the spring 25 engages the lower notch 27. This movement of the actuating member 20 frees it from its engagement with the spring 15 while still keeping it in engagement with the spring 14. With the parts in this position, clockwise rotation of the handle 16 will cause the spring 14 to unwind and to clutch the handle 16 to the shank 10. Counter-clockwise rotation of the handle 16 tends to cause the spring 14 to wind and to be reduced in diameter, thus causing it to recede from engagement with the inner surface of the handle 16. As the spring 15 is not in engagement with the handle or with the actuating member, the handle 16 can be rotated in a counter-clockwise direction without producing rotation of the shank 10.

When it is desired to use my device as a ratchet screw driver to turn a screw in a counter-clockwise direction, the actuating member 20 is moved to its upper position out of engagement with the spring 14. Free rotation of the handle 16 in a clockwise direction can then occur, but counter-clockwise rotation of the handle will result in the unwinding of the spring 15, thus causing the spring to expand into firm engagement with the inner surface of the handle.

In Fig. 2 is illustrated a different means for moving the spring-actuating member 20. In this construction, the shifting pin 21 extends through the slot 22 in the handle 16 and into a helical slot 31 in a collar 32 which is rotatable on the handle 16 and which is prevented from moving axially of such handle. With the collar 32 in position shown in the drawing, the spring-actuating member 20 is in its middle position and in engagement with both of the springs 14 and 15. By rotating the collar 32 relatively to the handle 16, it will be evident that the actuating member 20 can be moved axially of the handle to free it from engagement with either of the springs 14 and 15.

The construction described, in which the outer ends of the springs are connected to one rotatable member while either of the adjacent spring-ends may be disconnected from the other rotatable member, although not essential to my invention is convenient in that it makes possible a simple means for disconnecting either spring from the handle member. In the construction described, opposite ends of the springs are connected or are connectible to the same rotatable member, and the two springs are similarly wound; but it will be evident that the relation of the direction of winding of one spring to that of the other will depend on whether opposite or corresponding ends of two springs are connected to the same rotatable member.

I claim as my invention:

1. A ratchet device, comprising a driven member, a driving member rotatable relatively to said driven member and co-axial therewith, two coil springs each operatively connected to one of said members and extending into a circular axial recess in the other of such members, each of said coil springs having an external diameter normally less than the diameter of its associated recess, and means for connecting each of said springs to its associated recessed member and for disconnecting it therefrom, the parts being arranged so that when either of said springs is connected to its associated recessed member rotation of the driving member in a direction tending to unwind such spring will cause such spring to expand into firm frictional engagement with the walls of its associated recess.

2. A ratchet device, comprising a driven member, a driving member rotatable relatively to said driven member and co-axial therewith, two coil springs each operatively connected to one of said members and extending into a circular axial recess in the other of such members, each of said coil springs having an external diameter normally less than the diameter of its associated recess, and means for connecting each of said springs to its associated recessed member and for disconnecting it therefrom, said means being inoperative to effect the disconnection of both springs at the same time, the parts being arranged so that when either of said springs is connected to its associated recessed member rotation of the driving member in a direction tending to unwind such spring will cause such spring to expand into firm frictional engagement with the walls of its associated recess.

3. A ratchet device, comprising two relatively rotatable co-axial members, one of said members having an axial bore, similarly wound coil springs located within said bored member and having their outer ends connected to the other of said members, said springs having normally an external diameter less than the diameter of such bore, and means located in such bore between the adjacent ends of said springs for connecting either or both of said springs to said bored member.

4. A ratchet device, comprising two relatively rotatable co-axial members, one of said members having an axial bore, similarly wound coil springs located within said bored member and having their outer ends connected to the other of said members, said springs having normally an external diameter less than the diameter of such bore, and an actuating member rotatable with said bored member and located between the adjacent ends of said springs, said actuating member being slidable into and out of engagement with each adjacent spring-end.

5. A ratchet device as set forth in claim 4, with the addition that said actuating member near the mid-point of its travel engages both spring-ends, and releasably lockable means for holding said actuating member out of engagement with either spring.

In witness whereof, have hereunto set my hand at Indianapolis, Indiana, this 29th day of July, A. D. one thousand nine hundred and twenty-six.

WILLIAM CARLETON STARKEY.